United States Patent
Rodriguez et al.

(10) Patent No.: US 9,519,763 B1
(45) Date of Patent: *Dec. 13, 2016

(54) OPTICAL COGNITION AND VISUAL AUTHENTICATION AND AUTHORIZATION FOR MOBILE DEVICES

(71) Applicant: Delfigo Corporation, Boston, MA (US)

(72) Inventors: Raphael A. Rodriguez, Quincy, MA (US); Daniel Volovik, Chicago, IL (US)

(73) Assignee: Delfigo Corporation

( * ) Notice: Subject to any disclaimer, the term of this patent is extended or adjusted under 35 U.S.C. 154(b) by 21 days.

This patent is subject to a terminal disclaimer.

(21) Appl. No.: 14/291,623

(22) Filed: May 30, 2014

Related U.S. Application Data (63) Continuation-in-part of application No. 13/481,106, filed on May 25, 2012, now Pat. No. 8,850,541.

(60) Provisional application No. 61/829,354, filed on May 31, 2013, provisional application No. 61/490,924, filed on May 27, 2011.

(51) Int. Cl.
| | |
|---|---|
| *G06F 7/04* | (2006.01) |
| *G06F 21/31* | (2013.01) |
| *G06F 3/01* | (2006.01) |
| *G06F 3/0484* | (2013.01) |

(52) U.S. Cl.
CPC ........... *G06F 21/31* (2013.01); *G06F 3/013* (2013.01); *G06F 3/04842* (2013.01)

(58) Field of Classification Search
CPC .................................................. G06F 21/00
USPC .................................................. 726/26, 28
See application file for complete search history.

(56) References Cited

U.S. PATENT DOCUMENTS

| | | | |
|---|---|---|---|
| 5,559,961 A * | 9/1996 | Blonder | G07C 9/00142 726/18 |
| 5,821,933 A | 10/1998 | Keller et al. | |
| 6,492,979 B1 | 12/2002 | Kent et al. | |
| 7,844,825 B1 * | 11/2010 | Neginsky | G06F 21/36 713/184 |
| 7,986,816 B1 * | 7/2011 | Hoanca | G06K 9/00597 382/115 |
| 7,995,756 B1 * | 8/2011 | McKinney | G06F 21/10 380/247 |
| 8,046,721 B2 | 10/2011 | Chaudhri et al. | |
| 8,613,064 B1 * | 12/2013 | Roy | H04L 29/00 380/247 |
| 2002/0029341 A1 | 3/2002 | Juels et al. | |
| 2009/0085877 A1 | 4/2009 | Chang et al. | |
| 2009/0150992 A1 | 6/2009 | Kellas-Dicks et al. | |
| 2009/0284482 A1 * | 11/2009 | Chin | G06F 21/32 345/173 |
| 2010/0040293 A1 * | 2/2010 | Hermann | G06F 21/31 382/218 |
| 2010/0328265 A1 | 12/2010 | Hotelling et al. | |
| 2011/0196791 A1 * | 8/2011 | Dominguez | G06Q 40/00 705/44 |

* cited by examiner

*Primary Examiner* — Christopher Brown (57) ABSTRACT

A system and method is provided for visual authentication and authorization of a user for mobile devices, the system having: a login display on a mobile selection device displaying a visual pattern, a data collection engine whereby selection features are obtained from a plurality of user selection events to the mobile selection device with reference to the visual pattern, the selection attributes comprise measured selection attributes and derived selection attributes calculated from the measured selection attributes; an authentication engine whereby the selection attributes are compared to projected user selection attributes derived from user selection attribute values obtained during prior successful logins.

22 Claims, 7 Drawing Sheets

OPTICAL COGNITION AND VISUAL AUTHENTICATION AND AUTHORIZATION FOR MOBILE DEVICES

RELATED APPLICATIONS

This application claims the benefit of U.S. Provisional Application No. 61/829,354, filed May 31, 2013. This application is a continuation in part of U.S. application Ser. No. 13/481,106 filed on May 25, 2012 which claims benefit to U.S. Provisional Application No. 61/490,924, filed May 27, 2011. These applications are herein incorporated by reference in their entirety for all purposes.

FIELD OF THE INVENTION

The invention relates to user authentication systems, and more particularly, to an optical authentication and authorization system for mobile devices.

BACKGROUND OF THE INVENTION

The keyboard event models are inconsistent across different Smartphone and mobile platforms and identifying a dwell time for a key click on a touch screen seems unfeasible at this time. The programmatic UITouch class in Apple iOS, for example, cannot be utilized due to the fact that a keyboard automatically pops up and disables touch events when user tries to type in the iOS. The keystroke capture measurement of a user's typing flight time alone is not distinguishable to succinctly identify an individual, and would therefore offer very limited value in the authentication scheme. Many keystroke algorithms are built around the consistency of dwell values, which is how long a user presses a key, for a particular user. Therefore, the QWERTY keyboard biometrics, especially dwell time, are unsuited to touch screen displays and a color pattern usage is more intuitive for a natural user interaction.

Keystroke algorithms do not utilize features of touch screen devices that could provide further insight in to the identity of the owner. While known systems employ the idea of using graphical and/or touch (gesture) passwords for authentication, they are not known to use the attributes of the particular touch events. Such systems use continuous gestures as passwords, comparing the drawn gesture to previously trained gestures. They do not use discrete selection events, each with a range of characterizing elements.

There are additionally previous patents using discrete selections, but use the selections to perfectly recreate a previous set of selections. For example, selecting a series of points on a displayed photograph or selecting the correct subset from a grid of icons. The user is granted access if the match is perfect. There is no intelligent confidence factor based on how similar the current login touches are to previous touches.

In some instances it is advantageous for the user to operate the mobile device without recourse to their hands or speech, either as a result of incapacity or the increased security as a result of the increased difficulty for an observer to recognize non-verbal hands free activities.

What is needed, therefore, are techniques for biometrically authenticating a user based on attributes of a sequence of selection events.

SUMMARY OF THE INVENTION

One embodiment of the present invention provides a system for visual authentication and authorization of a user for mobile devices, the system having: a login display on a mobile device displaying a visual pattern; a data collection engine whereby selection features are obtained from a plurality of user selection events to the mobile device with reference to the visual pattern, the selection attributes comprise measured selection attributes and derived selection attributes calculated from the measured selection attributes; an authentication engine whereby the selection attributes are compared to projected user selection attributes derived from user selection attribute values obtained during prior successful logins.

Another embodiment of the present invention provides such a system wherein the visual pattern further comprises inclusion of decoy regions.

A further embodiment of the present invention provides such a system wherein the selection attributes comprise a selection attribute selected from the group consisting of exchange, intensity, globularity, selection feature movement velocity, selection feature movement location spread, selection intensity, and selection feature size.

Yet another embodiment of the present invention provides such a system wherein the visual pattern is a color grid.

A yet further embodiment of the present invention provides such a system wherein the visual pattern is a color wheel.

Still another embodiment of the present invention provides such a system wherein the visual pattern comprises a custom key arrangement.

A still further embodiment of the present invention provides such a system wherein the data collection engine is configured to collect device attributes selected from the group of device attributes consisting of host name, device type, serial number, International Mobile Equipment Identity (IMEI), electronic serial number (ESN), integrated circuit card identification (ICCID), modem firmware, device unique ID, name of device, model, system version, screen resolution, IP Address, Time Zone, GPS position, and compares the device attributes to device attributes of the user stored in the system.

Even another embodiment of the present invention provides such a system embodiment of the present invention provides such a system wherein the projected user selection attributes are averages of the user selection attribute values during prior successful logins.

An even further embodiment of the present invention provides such a system wherein the projected user selection attributes are regression analysis outputs of the user selection attribute values during prior successful logins.

Still yet another embodiment of the present invention provides such a system wherein at least one user selection event in the plurality is discrete.

One embodiment of the present invention provides a method for the authentication of a user of a system, the method having: requiring the user to enter a sequence of selection events to a display displaying a visual pattern; comparing the sequence of selections to a stored selection pattern; capturing a plurality of measured selection attributes; calculating a plurality of derived selection attributes; comparing the derived selection attributes to projected values for the selection attributes of the user; and allowing at least limited access by the user to the system if the derived selection attributes are consistent with the projected values.

Another embodiment of the present invention provides such a method further having prompting a user to select a user selection pattern sequence.

A further embodiment of the present invention provides such a method further prompting a user to enter the user selection pattern sequence a plurality of times so as to train the system to authenticate the user.

Yet another embodiment of the present invention provides such a method wherein the derived selection attributes comprise exchange.

A yet further embodiment of the present invention provides such a method wherein the derived selection attributes comprise intensity, Still another embodiment of the present invention provides such a method wherein the derived selection attributes comprise globularity.

Another embodiment of the present invention provides such a method wherein the derived selection attributes comprise selection feature movement velocity.

Another embodiment of the present invention provides such a method wherein the derived selection attributes comprise selection feature location spread.

Another embodiment of the present invention provides such a method wherein the derived selection attributes comprise selection intensity.

Another embodiment of the present invention provides such a method wherein the derived selection attributes comprise facial feature size.

A still further embodiment of the present invention provides such a method wherein at least one selection event in the sequence of selection events is discrete.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

As illustrated in the attached figures, a functional flow representation of one embodiment of the present invention implemented on a mobile native architecture or app like Apple iOS or Android. In such an embodiment, a new and innovative selection pattern identifying a user is supplied as an alternative to the QWERTY Keyboard biometric analysis. In one such embodiment the pattern may be a color pattern, while those skilled in the art will appreciate that other visual cues or images may be used to elicit a response from the user. A color pattern idea is especially useful in a Smartphone scenario because of the following.

Another possibility is to utilize visual capture features of the devices to capture selections made by a variation in a selection feature, without any touch or keystroke happening on the device. The movement of a facial feature or a body part can signify selections; each with a range of characterizing elements, which can be compared to previously trained selections.

The system configured according to one embodiment will not misbehave in scenarios like, when the user is traveling, walking, driving or doing some other "work or bodies in motion" and using the mobile device simultaneously. A Keyboard biometric pattern based analysis in these cases would have yielded inconsistent values; identifying or authenticating a user would have been problematic.

Figure 2:
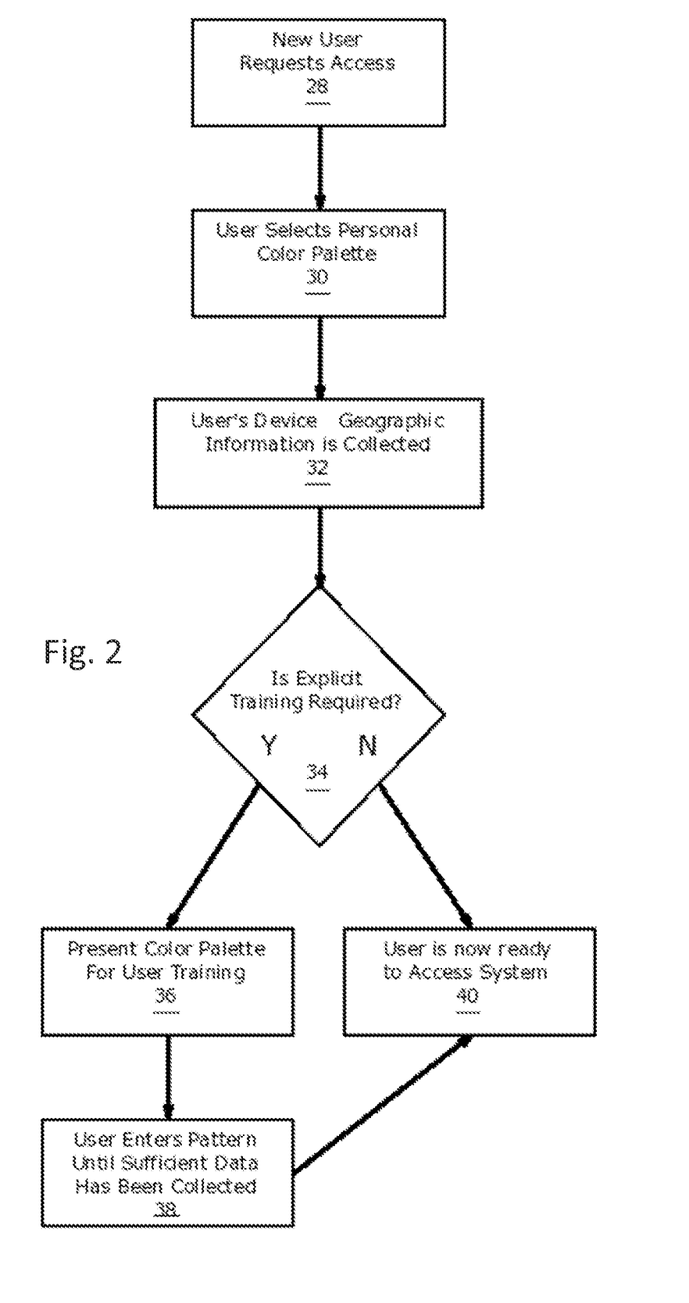
FIG. 2 is a flow chart illustrating a user enrollment and training sequence for use in a visual authentication and authorization system for mobile devices configured in accordance with one embodiment of the present invention.

In embodiments of the present invention having selection Pattern analysis there will be changes involved in the functional flow and integration as compared to the existing systems. In such a system, illustrated in FIG. 1, a primary sequence is entered and initiated as a user accesses something requiring authentication 12 in which a user is prompted to enter a "password-like" sequence of selections (via touch or other selection mode) to the screen 14. Each selection event in the sequence may comprise contact or hands free interaction of the user with the display at one or more point. In one embodiment each selection event may be discrete, that is, being a contact that is substantially non-moving in the x-y coordinate plane of the display. Raw data or measured quantities or measure selection attributes are collect while the user enters the data 16. The pattern or selection sequence is tested against a stored pattern 18 and if the sequence is inaccurate, user access is denied 20 without further biometric selection analysis. Visual patterns displayed by the device may include solid color fields, icons, images, photo, geometric patterns, animations or videos, or simulation of device turnoff. In instances where the sequence is correct, further analysis is conducted during which derived quantities are calculated from measured selection attributes 22. Measured and derives quantities are then compared to projected values derived from prior successful logins 24. While in one embodiment the projected value may be an average of all previous login, in other embodiments a small sample or subset of logins could be used. In a further embodiment, the projected value may use a regression analysis of past logins. If the measured and derived quantities are consistent with projected values, the user is allowed access 26 but is otherwise denied access 20.

Where a user has not been previously enrolled or is opening a new authentication account, the new user is prompted to set up the authentication features in an enrollment procedure such as are illustrated in FIG. 2. The user is prompted with the need to access the system 28. The user is then asked to select a selection pattern 30. While the prompt may be any image or pattern, one embodiment of the present invention uses a color palette. Such an embodiment is described for clarity. In an embodiment where a color palette is the prompt, a palette is selected by the user 30, during the process of selecting a palette, the Device, and Geographic (such as global positioning data) attributes are recorded 32.

Once enrolled, a user may either be prompted to train the device to recognize the user, or allowed access, while the selection pattern recognition is itself only activated once sufficient data has been collected. The decision as to whether training is required, may, in embodiments designed for enterprises be made without consultation of the user, while in consumer embodiments, the user may be allowed to decide if they consider training necessary for their own security requirements. The embodiment illustrated in FIG. 2 is shown as a consumer embodiment. In such an embodiment the user decides if training of the system is required 34. If it is, the user is prompted to repeatedly enter the selection pattern 36. Once the user enters a number of iterations of the selection pattern 38 the user reaches an iteration threshold completing the training. The number of iterations in an iteration threshold may in some embodiments be set by the user or be pre-defined by the system. If training is either declined or the threshold iterations have been reached, the user is allowed access 40.

Figure 1:
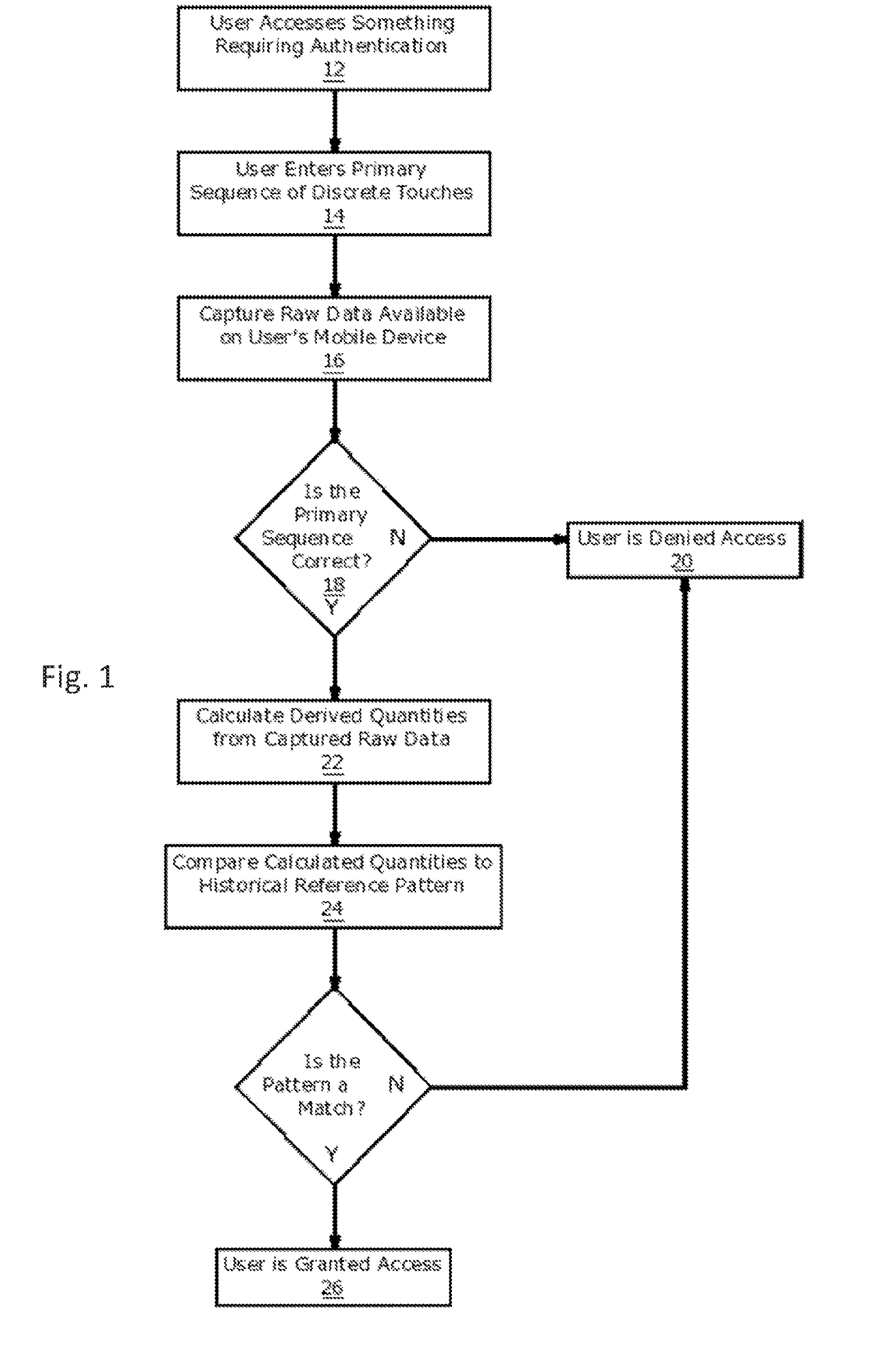
FIG. 1 is a flow chart illustrating a visual authentication and authorization system for mobile devices configured in accordance with one embodiment of the present invention.

As illustrated in FIG. 1, where a user is subject to selection pattern recognition requirements, measured data or measured selection attributes are collected from the selection pattern submitted as the primary sequence. Examples of measured selection attributes, which may be used in various embodiments, are provided in Table 1. As noted some of these items will be more readily useful in the context than others.

TABLE 1

| Measured Quantities | Android | iOS |
|---|---|---|
| Touch or stare start time | Yes | yes |
| Touch or stare end time | Yes | yes |
| X coordinate | Yes | yes |
| Y coordinate | Yes | yes |
| Size | Yes | no |
| Pressure | Yes | no |
| Touchmajor | Yes | no |
| Touchminor | Yes | no |
| Orientation of touch or glance | Yes | no |
| X accelerometer | Yes | yes |
| Y accelerometer | Yes | yes |
| Z accelerometer | Yes | yes |
| X orientation (of device via gyroscope) | yes | yes |
| Y orientation (gyroscope) | Yes | yes |
| Z orientation (gyroscope) | Yes | Yes |
| Selection Feature Movement Velocity | Yes | Yes |
| Selection Feature Location Spread | Yes | Yes |
| Selection Intensity | Yes | Yes |
| Selection Feature Size | Yes | Yes |

Examples of additional derived quantities or characteristics are provided in Table 2.

TABLE 2

| Derived Quantities | Definition | Description |
|---|---|---|
| Dwell | end(event)-start(event) | The duration of each individual selection event. |
| Flight | start(next event)-end(event) | The time between each individual selection event. |
| $<x>$ | Average x-coordinate of event | Average horizontal position of each individual selection event. |
| $<y>$ | Average y-coordinate of event | Average vertical position of each individual selection event. |
| $\delta x$ | difference between x coordinates of successive events | The difference in horizontal position between successive selection events. |
| $\delta y$ | difference between y coordinates of successive events | The difference in vertical position between successive selection events. |
| $<\delta x>$ | average of $\delta x$ | The average horizontal position difference between successive selection events. |
| $<\delta y>$ | average of $\delta y$ | The average vertical position difference between successive selection events. |
| Location | $\sqrt{[(x-<x>)^2+(y-<y>)^2]}$ | The distance from a particular selection and the average location of that selection event. |
| Exchange | $\sqrt{[(\delta x-<\delta x>)^2+(\delta y-(\delta y-<\delta y>)^2]}$ | The difference in location between successive selection events compared to the expected difference in location. |
| Intensity | Time series of pressure sampled repeatedly during selection event | How consistent the position of a selection even is throughout an individual selection event |
| Globularity | Spatial extent of Selection Event | The total area of the selection screen being selected during an individual selection event. |
| X-force | Time series of x accelerometer sampled repeatedly during event | The X direction acceleration of the mobile device during an individual selection event. |
| Y-force | Time series of y accelerometer sampled repeatedly during event | The Y direction acceleration of the mobile device during an individual selection event. |
| Z-force | Time series of z accelerometer sampled repeatedly during event | The Z direction acceleration of the mobile device during an individual selection event. |
| X-motion | Time series of x orientation | The component of device orientation in the X direction during an individual selection event. |
| Y-motion | Time series of y orientation | The component of device orientation in the Y direction during an individual selection event. |

TABLE 2-continued

| Derived Quantities | Definition | Description |
|---|---|---|
| Z-motion | Time series of z orientation | The component of device orientation in the Z direction during an individual selection event. |
| Active shift | Initial acceleration and subsequent motion along direction perpendicular to and into screen | The initial acceleration and subsequent movement caused by pressing on the screen during a selection event. |
| Reactive shift | Reactive acceleration and subsequent motion along direction perpendicular to and out of screen | The slowdown and movement back to the original device position once a particular selection event is over. |
| <v> | Average selection feature movement velocity | The speed at which a selection feature is in motion between selection events. |
| <δs> | Average selection feature location spread | The difference in location between multiple simultaneous selection features. |
| <μ> | Average selection intensity | How radical the change to signify selection is. |
| <Σ> | Determined selection feature size | The ratio of sizes between detected selection features. |

In one embodiment, each iteration of the selection pattern allows further data collection and further refines the system's profile of a particular user allowing for greater accuracy in identification.

Figure 3:
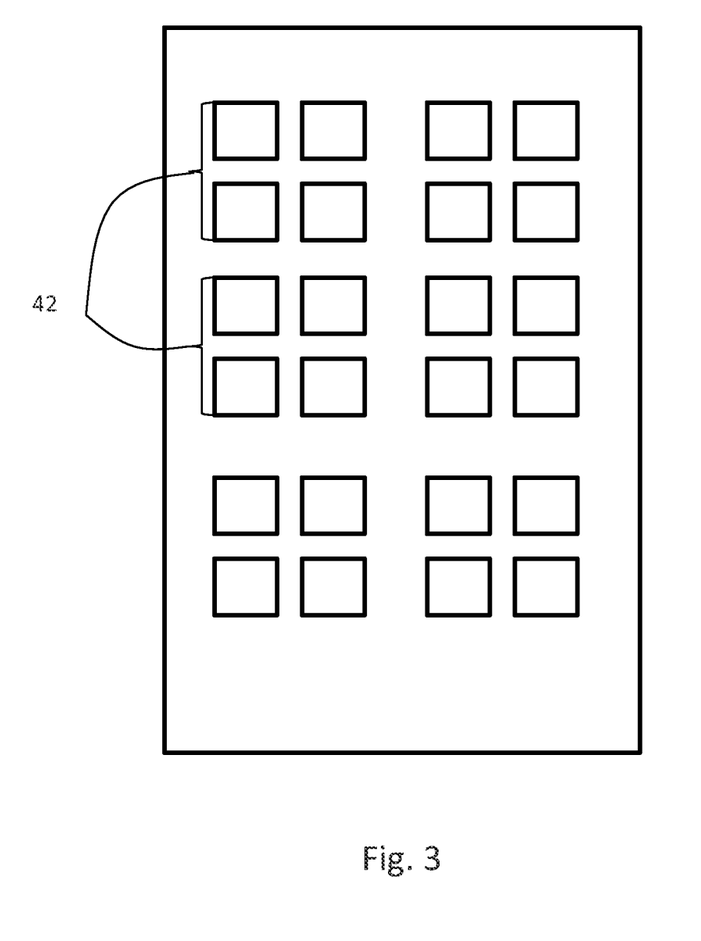
FIG. 3 is a block diagram illustrating a display pattern of visual authentication and authorization system for mobile devices configured in accordance with one embodiment of the present invention in which a plurality of color pallets are presented to the user in which the color pallet access code is obscured.
Figure 4:
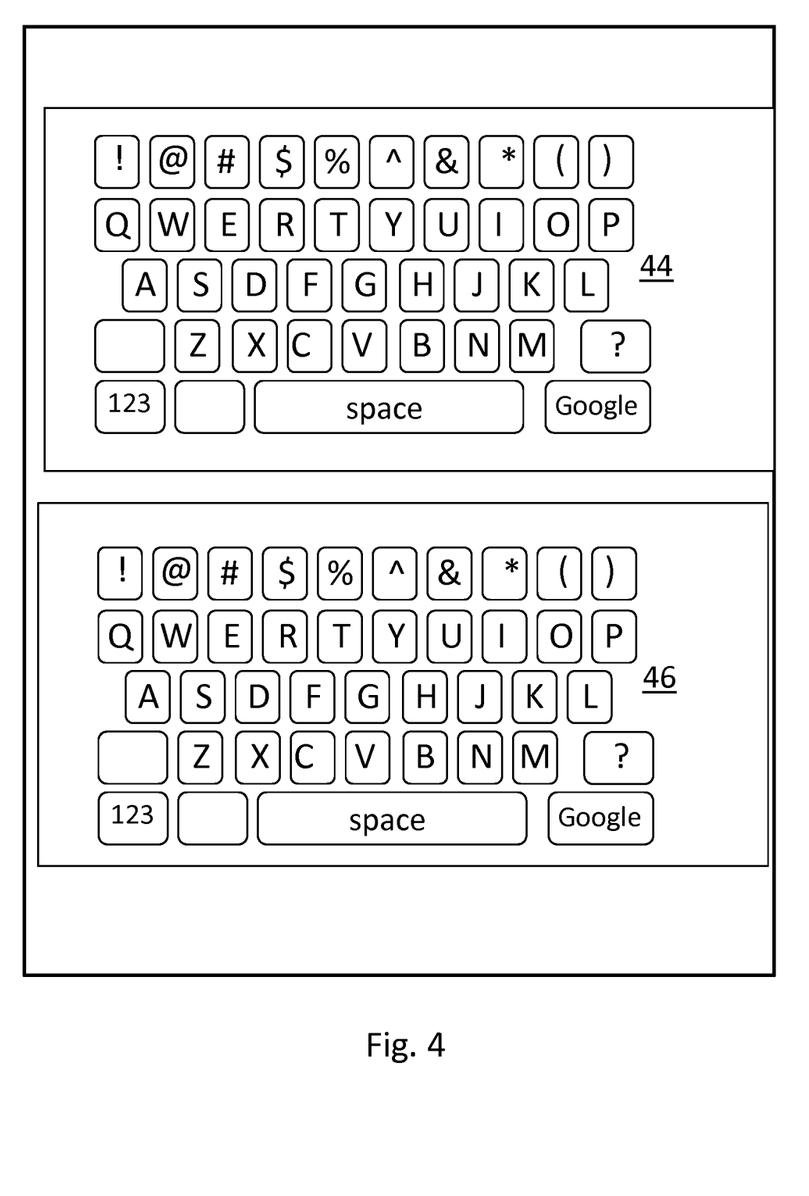
FIG. 4 is a block diagram illustrating a visual authentication and authorization system for mobile devices configured in accordance with one embodiment of the present invention with colorized QWERTY keyboards.
Figure 5:
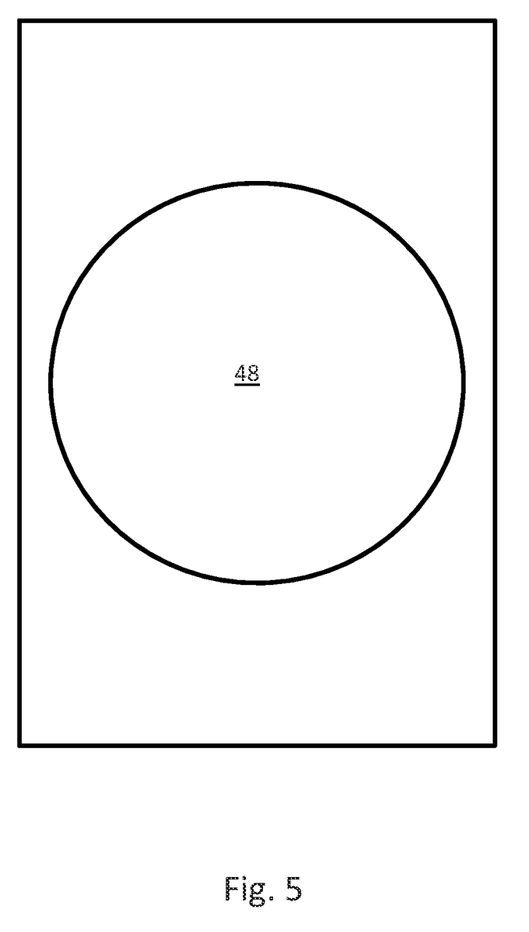
FIG. 5 is a block diagram illustrating a visual authentication and authorization system for mobile devices configured in accordance with eye movement activation.

In alternative embodiments such as that of FIG. 3 a series of palettes 42 may be offered in the login, one of which would contain the 4 color "pin". Alternatively, as in FIG. 4 a QWERTY capability may be offered in one of two colors 44, 46 doubling the number of possible combinations for each password. As in FIG. 5, a color wheel 48 may be used. A color wheel could be equipped with any number of possible colors increasing the number of possible combinations.

Figure 6:
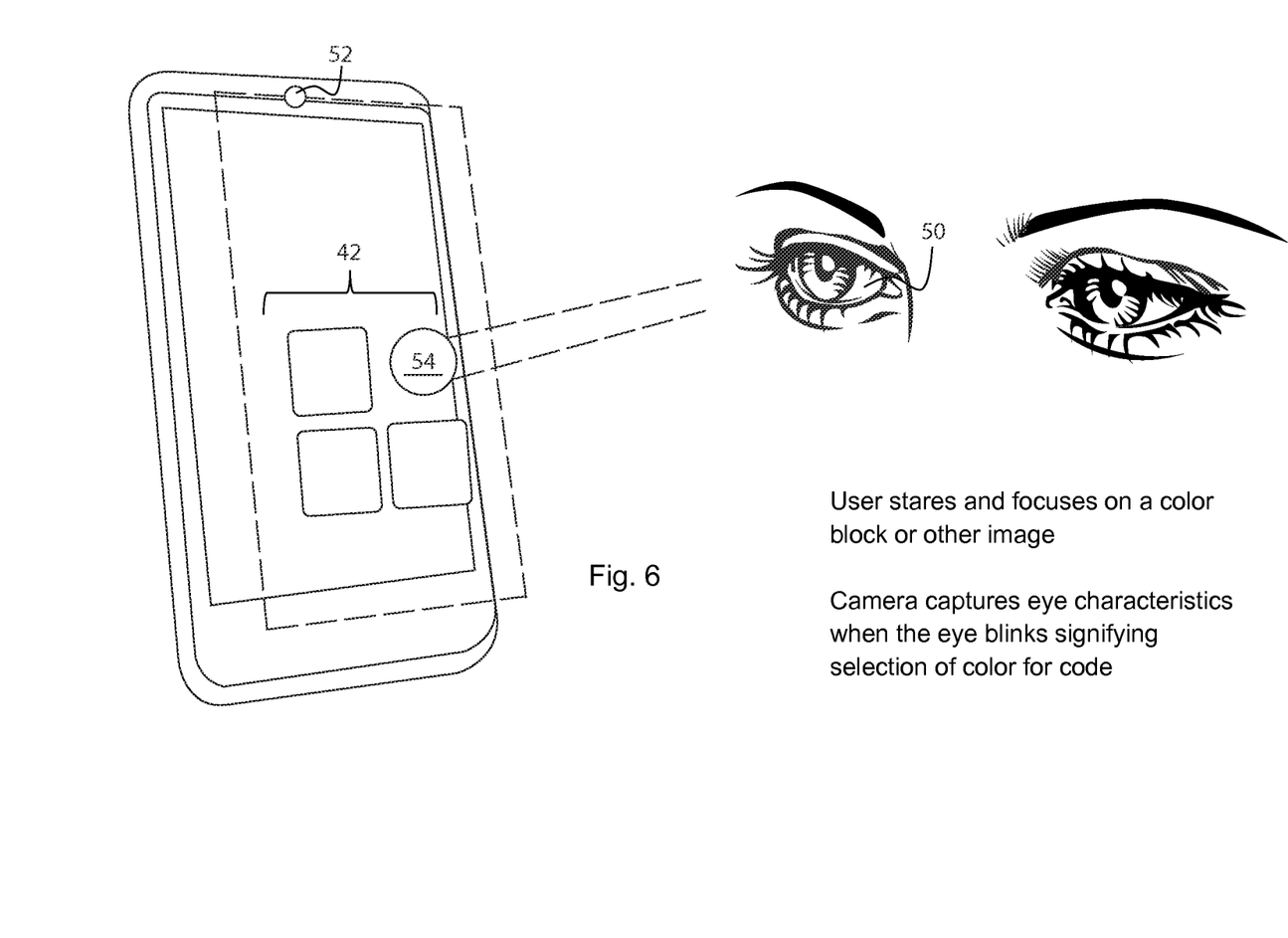
FIG. 6 is a perspective view illustrating a visual authentication and authorization system for mobile devices configured in accordance with one embodiment of the present invention with eye closure activation.
Figure 7:
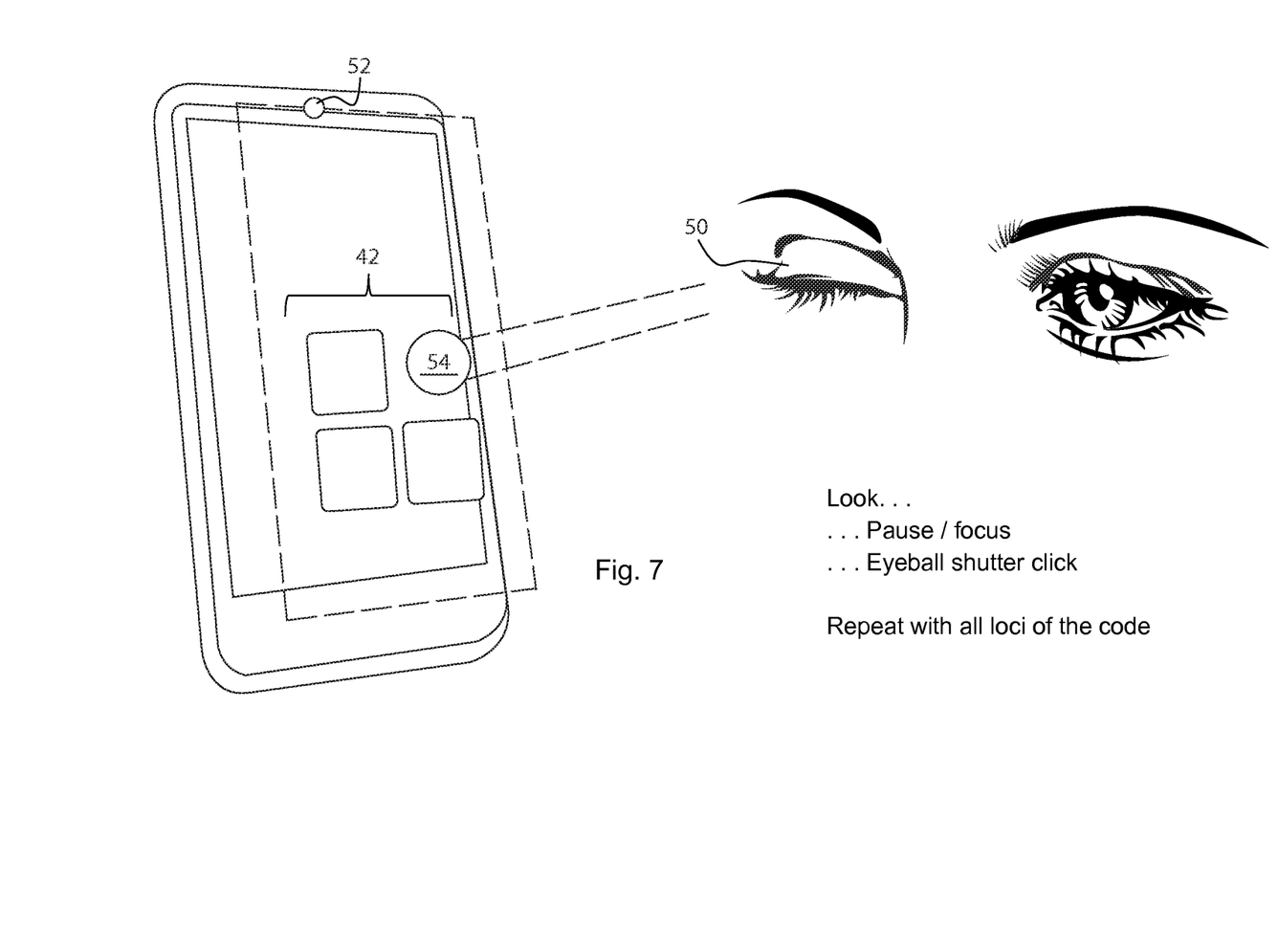
FIG. 7 is a perspective view illustrating a visual authentication and authorization system for mobile devices configured in accordance with one embodiment of the present invention with eye closure activation shown mid selection.

One embodiment of the present invention, illustrated in FIGS. 6-7, provides a system in which colors or image 42 or sequence may be selected by movement of an eye 50 tracked via a camera or selection tracker 52 disposed in the mobile device. In one embodiment a system of eye or selection tracking may be used such as that sold under the TOBII gaze interaction mark. No claim is made to TOBII gaze interaction, which is a trademark of TOBII Technology. One skilled in the art would appreciate that other suitable APIs or proprietary software may be used which provide for facial or facial feature recognition. In some such systems eyes are detected by the system through the use of multiple near IR microprojectors, which create reflection patters on subject's eyes, then register the reflected points via image sensors. The reflected images allow the system to identify the position of the eyes in real time and track gaze direction. Systems may be configured to identify physical characteristics of a user eye, monitor for eye closure movement and patterns of movement and dwell point, pupil dilation.

When a user selection event occurs, the variation in a selection feature points at a particular spot 54 on the displayed visual pattern or image 42. The distance from this particular selection point and the average position of this selection point is the location attribute. The exchange is calculated as the difference in this location between successive collection points compared to the expected difference. The intensity of a selection event is how consistent the selection point is throughout an individual selection event. Since the selection feature can move during a selection event, the total area that the selection covered during an individual selection event is the globularity of that selection event.

In such a system "key strokes" may be identified with either prolonged eye positioning (i.e. a stare) at a particular item to be selected, or through the use of blinks or eye to signal the device that the user selects that particular color or key. In one embodiment the choice between blinking or timed staring to identify the selected color or symbol is a setting selected by the user. A user may elect one or the other method depending on their personal preference or taking into considerations environmental factors like allergens, bright sunlight, or wind.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

That which is claimed:

1. A system for optical authentication and authorization of a user for mobile devices, the system comprising:
   a login display on a mobile device displaying a visual pattern;
   a data collection engine whereby a plurality of different selection attributes comprising exchange, intensity, and globularity obtained from a plurality of user selection events occurring to said mobile selection device with reference to said visual pattern during a single authentication cycle, said selection attributes comprise measured selection attributes and derived selection attributes calculated from said measured selection attributes;
   an authentication engine whereby selection attributes from said plurality of selection attributes are compared to projected user selection attributes derived from user selection attribute values obtained during prior successful logins.

2. The system of claim 1 wherein said visual pattern further comprises decoy regions.

3. The system of claim 1 wherein said visual pattern is a color grid.

4. The system of claim 1 wherein said visual pattern is a color wheel.

5. The system of claim 1 wherein said visual pattern is a picture.

6. The system of claim 1 wherein said visual pattern comprises a custom key arrangement.

7. The system of claim 1 wherein said data collection engine is configured to collect device attributes selected from the group of device attributes consisting of host name, device type, serial number, International Mobile Equipment Identity (IMEI), electronic serial number (ESN), integrated circuit card identification (ICCID), modem firmware, device unique ID, name of device, model, system version, screen resolution, IP Address, Time Zone, GPS position, and compares said device attributes to device attributes of said user stored in said system.

8. The system of claim 1 wherein said projected user selection attributes are averages of said user selection attribute values during prior successful logins.

9. The system of claim 1 wherein said projected user selection attributes are regression analysis outputs of said user selection attribute values during prior successful logins.

10. The system of claim 1 wherein at least one user selection event in said plurality is discrete.

11. A method for the authentication of a user of a system, said method comprising:
   requiring said user to enter, via eye movement, a sequence of selection events to a selection display displaying a visual pattern;
   comparing said sequence of selections to a stored selection pattern;
   capturing a plurality of different measured selection attributes comprising exchange, intensity, and globularity, from said eye movement;
   calculating a plurality of derived selection attributes;
   comparing said derived selection attributes to projected values for said selection attributes of said user; and
   allowing at least limited access by said user to said system if said derived selection attributes are consistent with said projected values.

12. The method of claim 11 further comprising prompting a user to select a user selection pattern sequence.

13. The method of claim 12 further comprising prompting a user to enter said user selection pattern sequence a plurality of times so as to train said system to authenticate said user.

14. The method of claim 11 wherein said derived selection attributes comprise exchange.

15. The method of claim 11 wherein said derived selection attributes comprise intensity.

16. The method of claim 11 wherein said derived selection attributes comprise globularity.

17. The method of claim 11 wherein said derived selection attributes comprise selection feature movement velocity.

18. The method of claim 11 wherein said derived selection attributes comprise selection feature location spread.

19. The method of claim 11 wherein said derived selection attributes comprise selection event intensity.

20. The method of claim 11 wherein said derived selection attributes comprise selection event size.

21. The method of claim 11 wherein at least one selection event in said sequence of selection events is discrete.

22. A method for the authentication of a user of a system, said method comprising:
   requiring said user to visually observe a sequence of locations on a display, displaying a visual pattern, with a front facing camera;
   comparing said sequence of view events to a stored visual pattern;
   capturing a plurality of different measured visual movement attributes comprising exchange, intensity, and globularity;
   calculating a plurality of derived visual movement attributes;
   comparing said derived visual attributes to projected values for said visual attributes of said user; and
   allowing at least limited access by said user to said system if said derived visual attributes are consistent with said projected values.

* * * * *